(No Model.)
J. V. STRIBLING.
STEERING APPARATUS FOR TRACTION ENGINES.
No. 348,538. Patented Aug. 31, 1886.
Fig. 1.
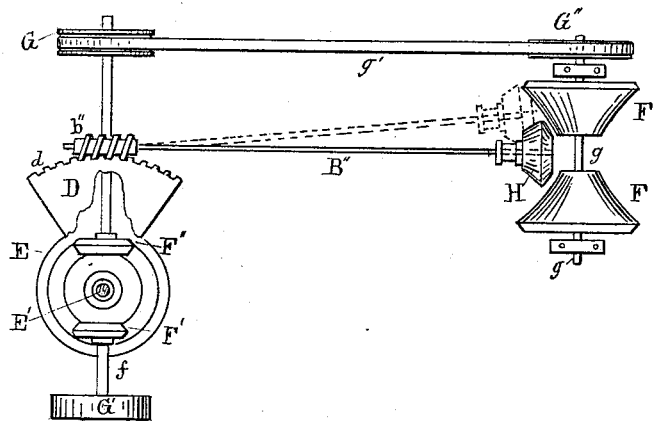
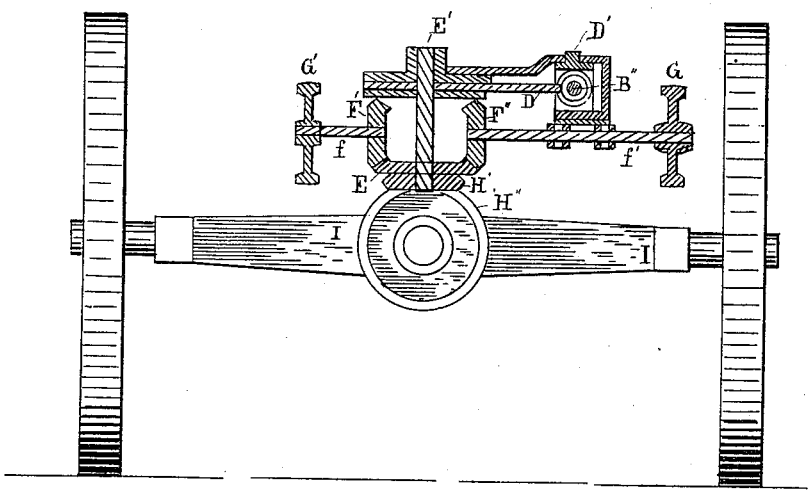
Fig. 2.
Witnesses
Inventor
John V. Stribling
Per Wm. R. Singleton
Atty.

UNITED STATES PATENT OFFICE.

JOHN V. STRIBLING, OF WESTMINSTER, SOUTH CAROLINA.

STEERING APPARATUS FOR TRACTION-ENGINES.

SPECIFICATION forming part of Letters Patent No. 348,538, dated August 31, 1886.

Application filed January 5, 1885. Serial No. 152,005. (No model.)

*To all whom it may concern:*

Be it known that I, JOHN V. STRIBLING, of Westminster, in the county of Oconee and State of South Carolina, have invented certain Improvements for Steering Apparatus for Guiding or Governing Machinery, Engines, &c., of which the following is a specification.

This invention relates to improvements in steering apparatus, designed principally for use in road or traction engines, but which can be used in vessels propelled by power, where the same can be advantageously applied, all of which will be hereinafter more particularly described, and pointed out in the claims.

In the drawings forming part of this specification, Figure 1 is a plan view of the apparatus applied to the central driving-gear of a traction-engine. Fig. 2 is a section of a part of the gearing of a traction-engine with the steering apparatus applied.

F F represent two beveled friction-rollers, the beveled surface of each being slightly curved. These rollers are fastened on the shaft $g$ in reverse order to each other, to engage with a friction-roller, H, having a beveled end convex to correspond with the concave surface of the rollers F F. H is attached to the shaft B'' by a spline, and when rotated carries the shaft with it, but can slide on the shaft to come in contact with the conical surfaces of the two rollers F F at their different diameters, as shown in dotted lines in Fig. 1. On the opposite end of shaft B'' is a worm-thread, which engages with the cogs $d$ of the segment D, attached to the wheel E, and central pin, E', by which, through proper gearing, (shown and described in a patent issued to me June 13, 1882, and numbered 259,600, and unnecessary to be repeated here,) the axle I is turned in any direction and at varying speed, as may be required.

The inner end of shaft B'' is pivoted in a bearing, D', which is attached to the operating mechanism on the axle of the engine, and shaft B'' can be traversed from side to side, as indicated in broken lines in Fig. 1.

The segment-rack D is attached to the central pin, E', and wheel E connected with the axle of the operative mechanism on the engine. In a locomotive road-engine this pin or vertical shaft E' and wheel E are connected to the driving machinery in such a manner that when operated upon by means of the steering apparatus it turns the axle in the direction required. In the drawings Fig. 1 the segment D is so attached to the machinery over the axle that the movement of the endless screw $b''$ causes the axle to traverse correspondingly, and consequently give the proper direction for turning the vehicle.

The pulley G' is fastened on a short shaft, $f$, having on the inner end a beveled gear, F', which drives the horizontal beveled wheel E, in which is secured the vertical pin E', and which is connected with the frame in which the axle I is journaled, also the machinery by which the axle is rotated for locomotion, as described in the patent to me referred to above. Opposite to the beveled wheel F' is a corresponding beveled wheel, F'', on a shaft, $f'$, which is supported under the frame of the worm-screw $b''$. On the outer end of shaft $f'$ is a pulley, G, which is connected to the pulley G'' on the shaft $g$ by a belt, $g'$, which communicates motion to shaft $g$ and rollers F F.

The pulley G' is to be driven by the motive power of the locomotive by a belt; or a spur or beveled gear wheel may be substituted for pulley G' if the driving-engine should be placed immediately over the axle I, and not at a distance from it. Motion is communicated from the driver G', through F' and F'', and shafts $f$ and $f'$, pulleys G and G'', belt $g'$, and shaft $g$ and its rollers F F, to the friction-roller H, and shaft B'' and its worm $b''$ to the segment-rack D $d$, and, finally, to the axle I, as before described, whereby said axle is turned in either direction and at any desired speed, as friction-roller H may be made to impinge upon the small or large diameter of the rollers F F.

The steering apparatus thus above described is connected in any suitable manner with the engine which drives the motive-wheels for moving the vehicle, either by a band and pulleys or by cogged gearing.

I claim—

1. In a steering apparatus, the combination of the reversed conical friction-rollers F F, the sliding friction-roller H, the shaft $g$, pulley G'', the shaft B'', worm-wheel $b''$, and segment-rack D $d$, substantially as and for the purpose described.

2. The combination of the driving apparatus of a motive power, the pulleys G' G G'', and connecting-shafts and belt, the shaft $g$, rollers F F and H, shaft B'', worm-wheel $b''$, segment-rack D $d$, wheel E, and pin E', and axle I, substantially as and for the purpose described.

JOHN V. STRIBLING.

Witnesses:
R. A. MATHEWSON,
J. D. M. DILLARD.